Oct. 18, 1932.  J. SENFT  1,883,000
ANTISKID CHAIN
Filed May 14, 1931
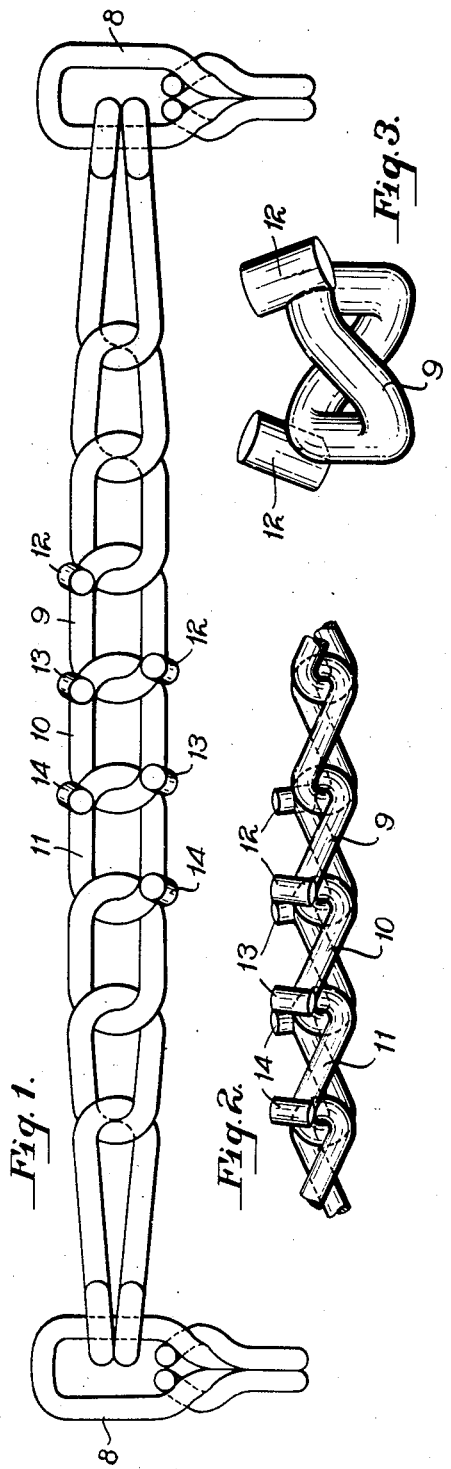
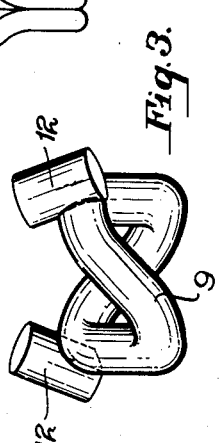
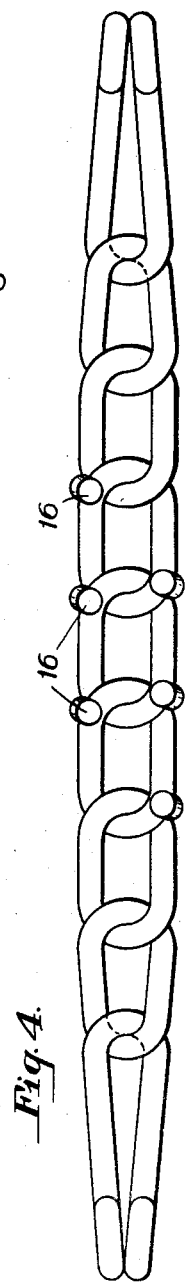
INVENTOR
John Senft,
By Archworth Martin,
Attorney.

Patented Oct. 18, 1932

1,883,000

UNITED STATES PATENT OFFICE

JOHN SENFT, OF YORK, PENNSYLVANIA, ASSIGNOR, BY MESNE ASSIGNMENTS, TO THE McKAY COMPANY, OF PITTSBURGH, PENNSYLVANIA, A CORPORATION OF PENNSYLVANIA

ANTISKID CHAIN

Application filed May 14, 1931. Serial No. 537,270.

My invention relates to anti-skid devices and particularly to tire chains for use on automobiles and the like.

One of the objects of my invention is to provide a tire chain or chain link of such form that the wearing life thereof is considerably increased without materially increasing the thickness of the links in directions perpendicular to the plane thereof.

Another object of my invention is to provide an improved means for preventing slipping or skidding of a wheel to which the chain is attached, and to increase the tractive quality thereof.

Another object of my invention is to provide chain links having calks secured to the sides thereof in a manner that will minimize danger of the calks breaking loose from the links.

Still another object of my invention is to provide a calk link of generally simplified and improved form.

Some of the forms which my invention may take are shown in the accompanying drawing wherein Figure 1 is a plan view or face view of a portion of a chain embodying my invention; Fig. 2 is a side elevational view of a portion of the structure of Fig. 1; Fig. 3 is an end elevational view of one of the links of Fig. 1, on an enlarged scale; Figs. 4, 5 and 6 are views corresponding to Figs. 1, 2 and 3, respectively, but showing a modified form of link.

Referring first to Figs. 1, 2 and 3, I indicate portions of side chains by the numerals 8, which chains may be of any well-known form such as are commonly employed for maintaining the tread chains or cross chains in proper position on the wheel.

It will be understood that as many cross chains as may be required are provided, only one of such cross chains being shown on the drawing. Only those links of the cross chains which ordinarily engage the roadway during normal conditions of operation need be provided with calks. In the present case, three such links are shown designated by the numerals 9, 10 and 11.

The links 9, 10 and 11 are provided with calks 12, 13 and 14, respectively, each link having a calk electrically welded or otherwise secured thereto at the protuberant portions thereof. These protuberant portions result from bends formed in the links adjacent to their ends, where they cross or are interconnected with adjacent links, which bends are necessary in order that all of the links may lie in substantially a common plane.

The calks 12, 13 and 14 are in the form of short metal bars or studs and when electrically welded to the links, will be slightly dished through welding pressure and softening of the metal when heated to welding temperature, as shown more clearly in Fig. 3. There is thus produced an interlocking or shouldered effect between the calks and the link at points intermediate the ends of the calks, so that greater resistance is offered to the breaking away of the calk from the link when thrusts are imposed upon the calks especially thrusts in an endwise direction. This resistance to breaking loose of the calks is, of course, much greater than if a mere spot weld were formed without substantial deformation of the metal at the points of engagement between the calks and the link during the welding operation.

Pressure is, of course, applied to the calks during the time that welding current is being passed through the calk and the link, and while the metal is soft. The metal of the link will also likewise be deformed somewhat during such pressure.

The increased width or area of metal adjacent to the points at which the link ordinarily comes in contact with the roadway, namely, the protruberant bends, increases the life of the chain, and the thickness of the link at such point is not so great as if the calks were welded against the outer faces thereof instead of against the sides of the link. There is therefore less tendency to injure the tire, and smoother riding is also secured.

Furthermore, the position of the studs is such that they not only resist skidding, but they provide increased traction. During rotation of the wheel to which the chain is applied, the calks will be brought into contact with the roadway, before the body portions of the links, and by reason of their bar-like character, their ends will grip the roadway and offer greater resistance to skidding and slipping than if they were placed in approximate parallelism with the plane of the links.

Referring now to Figs. 4, 5 and 6, I show a structure that is similar to the structure of the other figures, but wherein the calks 16 are of shorter length than the calks 12, 13 and 14. The calks 16 being shorter than the calks of the other figures, will, of course, not last so long as do the other calks, but they afford substantially the same resistance to skidding and slipping. With the shorter calks there is, of course, smoother riding.

Even after the calks of the various figures become worn down somewhat, they are still effective to relieve the links of wear and to resist skidding and slipping, because they are placed against the sides of the links instead of on the outer faces thereof, and will engage the roadway each time that the cross chain is carried into position between the wheel and the roadway.

I claim as my invention:—

1. An anti-skid chain containing inter-connected links bent adjacent to their ends to permit them to lie in substantially a common normal plane, and bar-like calks secured to the sides of said bends at points removed from the faces thereof, the said calks extending in directions generally perpendicular to the plane of the links, but the calks at one side of the chain being inclined in directions opposite to those at the other side thereof.

2. A chain link having bar-like calks secured to opposite sides thereof at points removed from the face of the link, the calks extending in directions generally perpendicular to the normal plane of the link, but being inclined in opposite directions.

3. A chain link having bar-like calks secured to opposite sides thereof at points removed from the face of the link, the calks extending in directions generally perpendicular to the normal plane of the link, but being inclined in directions toward one another.

4. An anti-skid chain containing interconnected links bent adjacent to their ends to permit them to lie in substantially a common normal plane, and bar-like calks secured to the sides of said bends at points removed from the faces thereof, the said calks extending in directions generally perpendicular to the plane of the links and to points beyond the road-engaging surfaces of the links, but being inclined in directions transversely of the link.

5. A chain link having its ends twisted to approximately 90° relative to each other, calks secured to the sides of the protuberances formed by said bends, the said calks extending in directions generally perpendicular to the normal plane of the link but being inclined in directions transversely of the longitudinal axis of the link.

6. A chain link having its ends twisted to approximately 90° relative to each other, calks secured to the sides of the protuberances formed by said bends, the said calks extending in directions generally perpendicular to the normal plane of the link but being inclined in opposite directions and toward the longitudinal center line of the link.

In testimony whereof I, the said John Senft, have hereunto set my hand.

JOHN SENFT.